United States Patent [19]

Deakins

[11] Patent Number: 4,518,177
[45] Date of Patent: May 21, 1985

[54] HUBLESS PIPE COUPLING

[76] Inventor: Thomas A. Deakins, Star Rte., Sequatchie, Tenn. 37374

[21] Appl. No.: 607,730

[22] Filed: May 9, 1984

Related U.S. Application Data

[63] Continuation-in-part of Ser. No. 326,106, Nov. 30, 1981.

[51] Int. Cl.³ .............................................. F16L 3/00
[52] U.S. Cl. ...................................... 285/64; 285/373; 248/62
[58] Field of Search .................... 285/373, 369, 61, 64, 285/243, 252, 253; 248/62

[56] References Cited

U.S. PATENT DOCUMENTS

| 1,905,324 | 4/1933 | Waters . | |
|---|---|---|---|
| 2,165,920 | 7/1939 | Burnip | 285/373 X |
| 2,225,208 | 12/1940 | Crickmer . | |
| 2,535,694 | 12/1950 | Payne . | |
| 3,194,590 | 7/1965 | Cook | 248/62 X |
| 3,233,922 | 2/1966 | Evans . | |
| 3,359,017 | 12/1967 | Schaub . | |
| 3,586,354 | 6/1971 | Boscacci | 285/364 |
| 3,652,045 | 3/1972 | Hirt | 248/62 |
| 3,993,377 | 1/1976 | Arrowood | 285/61 |
| 4,026,586 | 5/1977 | Kennedy et al. . | |
| 4,093,283 | 6/1978 | Weinhold | 285/243 |
| 4,101,151 | 7/1978 | Ferguson . | |
| 4,135,744 | 1/1979 | Fouts | 285/253 |
| 4,172,607 | 10/1979 | Norton . | |
| 4,299,413 | 11/1981 | Neher | 285/373 X |

FOREIGN PATENT DOCUMENTS

| 251987 | 1/1967 | Austria | 285/369 |
|---|---|---|---|
| 1119066 | 12/1961 | Fed. Rep. of Germany | 285/373 |
| 1520734 | 3/1968 | France | 285/369 |

Primary Examiner—Dave W. Arola
Attorney, Agent, or Firm—Fidelman, Wolffe & Waldron

[57] ABSTRACT

An improvement in hubless pipe couplings is provided by a split housing which encompasses the pipe barrels and compressed sealing sleeve-type prior art couplings so that lateral and axial displacement of the barrels and displacement of the sealing sleeve are prevented. The invention is particularly adaptable to existing couplings so that greater-than-normal internal pressures may be withstood.

7 Claims, 17 Drawing Figures

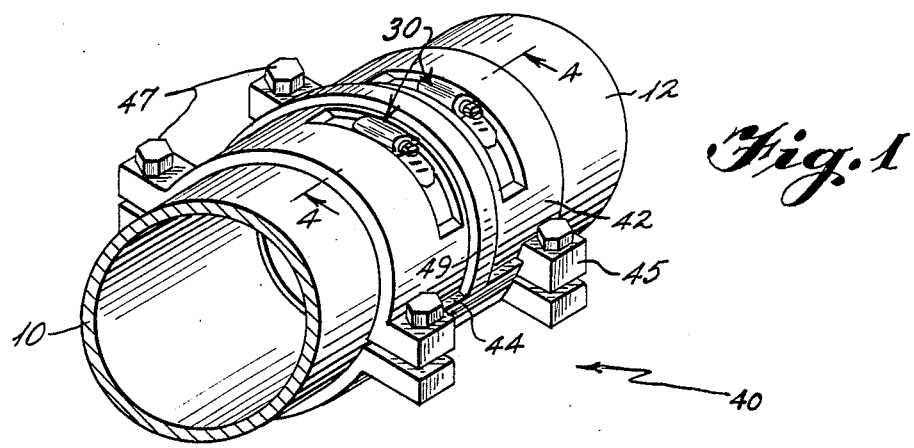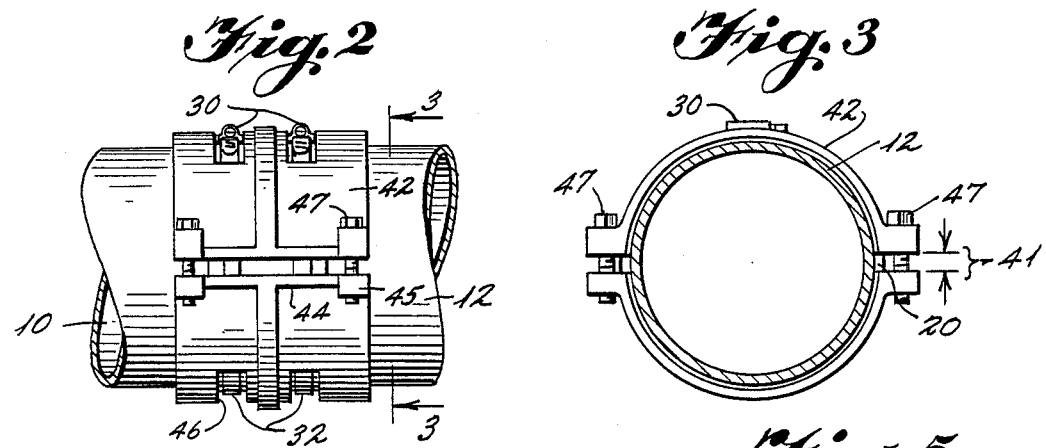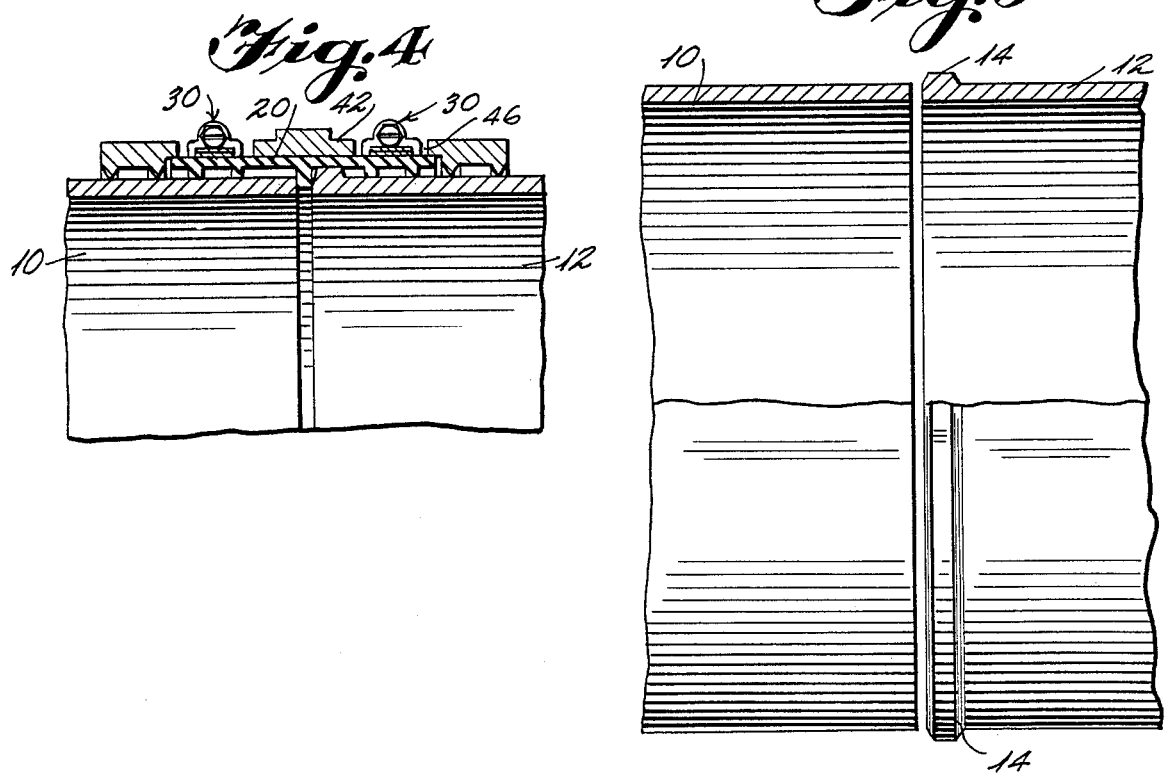

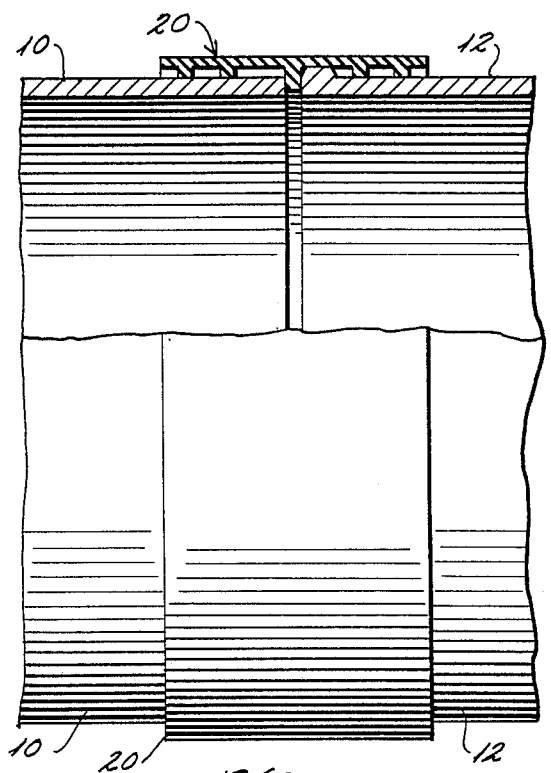
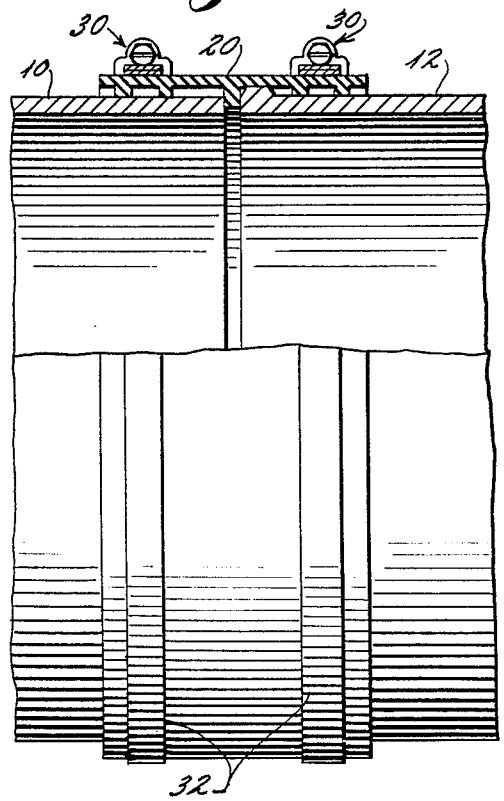
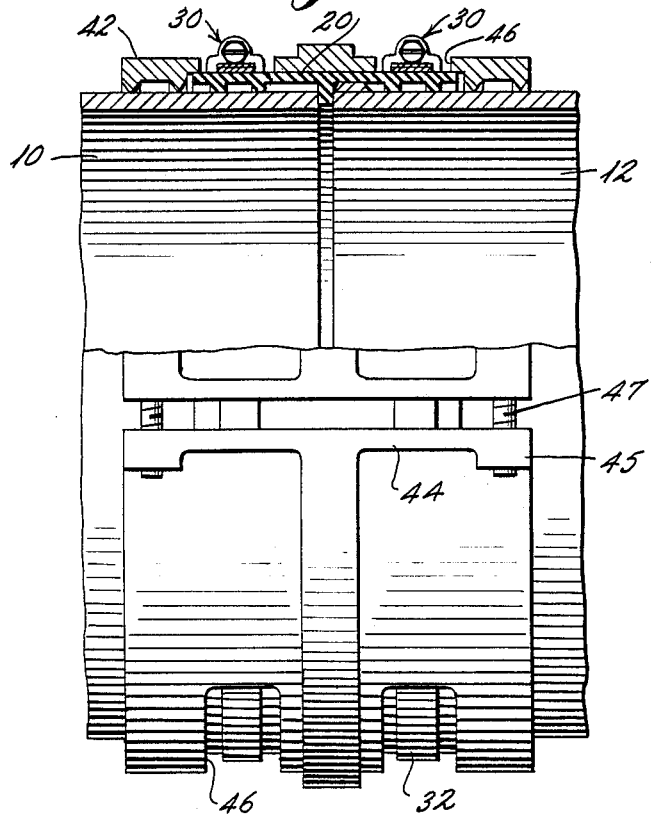
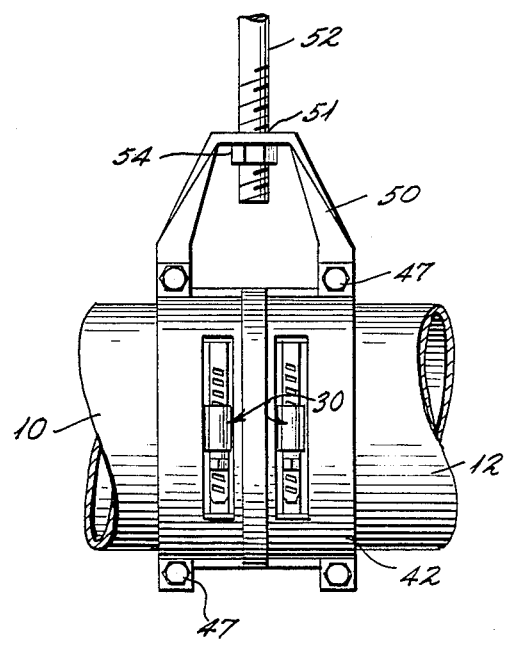

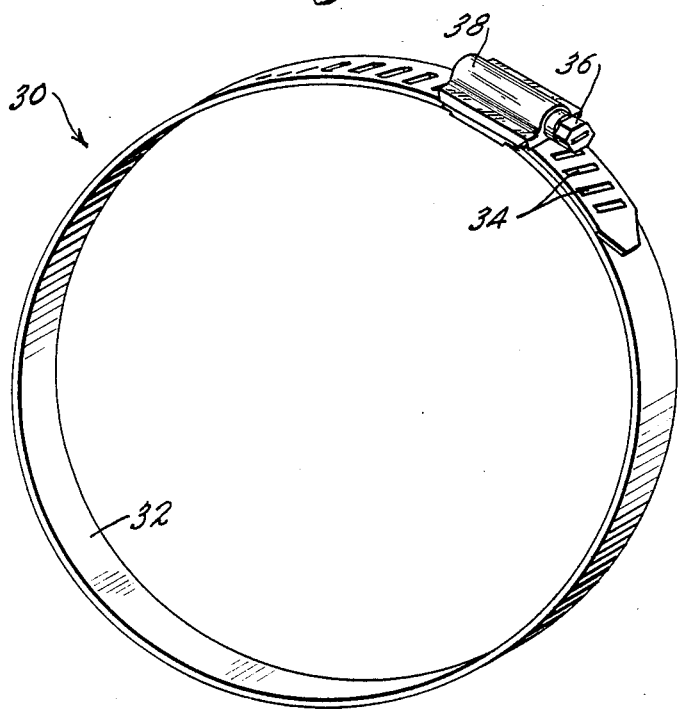
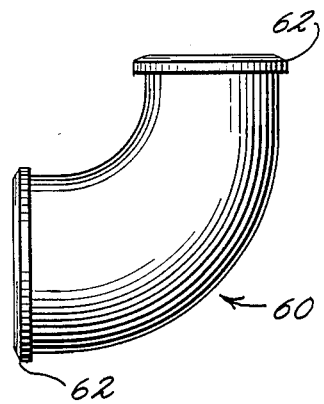
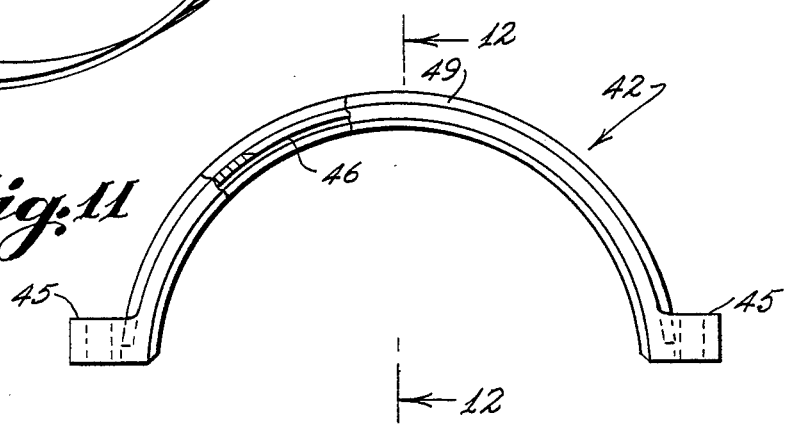
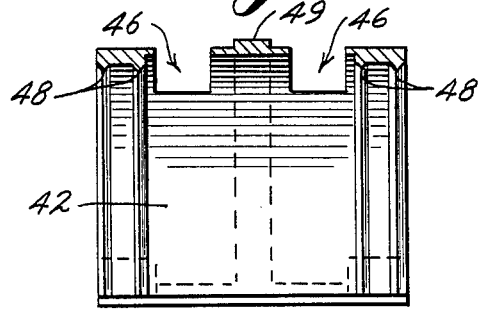
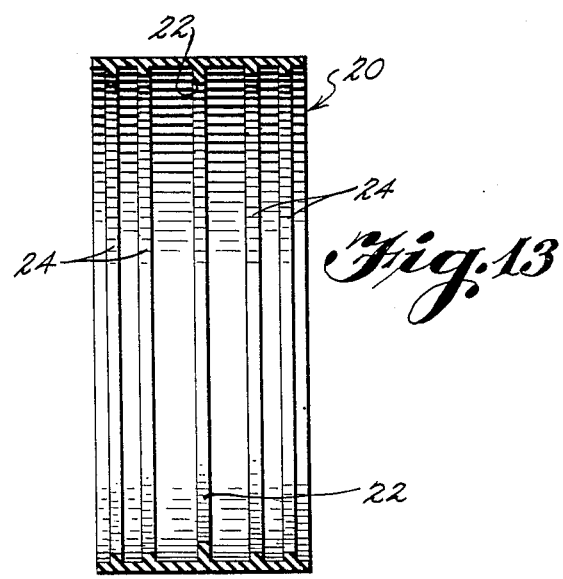

HUBLESS PIPE COUPLING

This application is a continuation-in-part, of application Ser. No. 326,106, filed Nov. 30, 1981.

CROSS-REFERENCES TO PRIOR ART

U.S. Pat. No. 4,172,607, PIPE COUPLING WITH PLASTIC SHEATH—Norton

U.S. Pat. No. 4,101,151, CLAMP ASSEMBLY—Ferguson

U.S. Pat. No. 4,026,586, PLANE END PIPE JOINT—Kennedy, Jr., et al.

U.S. Pat. No. 3,233,922, PIPE JOINT—Evans

U.S. Pat. No. 3,359,017, PIPE COUPLING OF CORRUGATED SHIELD TYPE—Schaub

U.S. Pat. No. 2,535,694, SELF-SEALING COUPLING—Payne

U.S. Pat. No. 2,225,208, PIPE COUPLING—Crickmer

U.S. Pat. No. 1,905,324, PIPE COUPLING—Waters

BACKGROUND AND BRIEF SUMMARY OF THE INVENTION

In the installation of rigid pipe, particularly cast iron pipe employed for sewage, sanitary and domestic plumbing, it is necessary to couple or clamp together the ends of the pipes in a fluid-tight, aligned relationship. Some such pipes have hubs or flanges on the ends thereof which radiate outwardly from the axis of the pipes and are bolted together, with a gasket therebetween, for a strong, sealed pipe coupling. Although providing a strong coupling, the hubs increase the expense of manufacture. Other such pipes have complementary bell and spigot ends which are sealed by packing oakum in the bell around the spigot, pouring lead over the oakum, and hand-caulking until the joint is pressure-tight. In addition to being a time consuming and expensive procedure, the bell and spigot arrangement has certain limits of application and presents a fire hazard.

To overcome the problems inherent in these prior art couplings, the industry has turned to the use of hubless cast iron pipe. The ends of these pipes are substantially identical and are placed in an abutting relationship for aligned end-to-end sealing. Thus, it is desirable to provide a simple, easily manufactured and applied, economical coupling or clamping assembly for joining hubless pipes in a fluid-sealing end-to-end relationship. The clamping assembly should accommodate slight variations in the external pipe diameters, particularly with hubless cast iron pipes employed for plumbing and sewage applications.

For some time, sand molds have been used in the production of hubless cast iron soil pipe and fittings, to tolerances compatible with the process. Of late, most soil pipes are cast in metal molds where tolerances of a closer nature can be maintained. However, since both processes are in practice, it is necessary to maintain a rather wide tolerance between the maximum and the minimum outside diameter of soil pipe and fittings. Also, since these products must be joined together in a leak-free system, a coupling for them must be compatible with the relatively wide range of dimensions encountered. For instance, for a four-inch nominal size pipe line, one may expect to encounter outside diameter ranging from 4.33 inches to 4.53 inches.

Several couplings for joining soil pipe are in commercial use, both patented and unpatented. The above cross-referenced U.S. Pat. No. 3,233,922 describes that coupling which is probably the most widely used by the industry, in which an annular elastic gasket fits over the adjacent ends of pipe sections to be joined together and is encircled by metal straps or the like which may be contracted to compress the gasket against the pipe ends in a clamping relationship. While this coupling produces a satisfactory joining method under most conditions, it does not provide satisfactory sealing when greater-than-normal internal pressures are encountered, such as in the blockage of the vertical stack of a multistory building. Further, this prior art clamp or coupling does not provide sufficient inherent structural strength to eliminate the need for additional bracing of the pipeline near the coupling.

Several other clamped-band type soil pipe couplings have been suggested and used previously, and various improvements have been made upon this general type of coupling without obtaining the advantages of the instant invention. For instance, to prevent axial displacement of pipeline sections, an annular groove sometimes is formed near each end of a section, and a coupling housing, which is engagable within the annular grooves, is then fastened around the sections. It is undesirable to provide these grooves in the pipe sections, since it weakens the pipe sections while increasing the expense of manufacture thereof. However, with prior art couplings, omission of this groove has presented difficulty in preventing the ends of the sections from pulling apart, both axially and laterally, when greater-than-normal internal pressures are encountered at the coupling.

Although available couplings have been sufficient in the past, the use of hubless cast iron soil pipes in multistory construction projects has presented the need for an improvement, so that greater-than-normal internal pressures within the stack or pipeline could be accommodated. For instance, during the construction of multi-story buildings, it is desirous to test these waste stacks for their fluid-tight integrity. These stacks may extend fifty stories or higher, with the internal pressure on a particular coupling increasing with the height of the fluid head above the coupling. Additionally, during construction, or in later use, an obstruction may occur in the lower portion of the stack such that there is a fluid backup within the stack and a subsequent increased internal fluid pressure at the couplings. Accordingly, there is a definite need for an improved coupling for hubless soil pipes in this environment.

It is an object of this invention to join hubless cast iron soil pipe to similar pipe or fittings, with or without spigot beads.

It is a further object of this invention to provide a coupling for hubless cast iron soil pipe which is sufficiently flexible to adapt to varying outside diameters of pipe and fitting ends, yet sufficiently rigid to support and hold the pipe and prevent separation of pipe-to-pipe or pipe-to-fitting joints when subjected to greater-than-normal internal pressures.

Another object of this invention is to improve over prior art compression-only type hubless pipe couplings wherein ends are only held together by the frictional engagement of a flexible seal compressed around the external diameter of the ends of the pipes.

Another object of this invention is to provide a coupling which may be used with a pipe hanger attached to the coupling in order to eliminate the need for separate, additional hanger assemblies near the coupling as well as to eliminate the need for additional bracing of pipes having outside diameters greater than or equal to six inches.

This invention relates to pipe joints, and consists more particularly in new and useful improvements in a joint primarily designed for connecting aligned sections of cast iron pipe having substantially identical ends. In other words, the joint of the present invention is not intended for pipe sections having complementary bells and spigots and is not intended for hubbed pipe sections. Inherent problems in the prior art design of hubless pipe couplings arise from the fact that the sealing pressure and the force needed to hold the pipes end-to-end are applied with a clamping, compressive force around the external diameter of the pipe ends. The instant invention is an improvement over the prior art in that separte means are provided for separate functions, i.e., sealing pressure is applied with tightening bands (as in the prior art) and separate clamp halves are used to hold the pipes end-to-end. It may be noted that while the joint is herein described as used in connection with cast iron pipe, its construction and principle of operation may also be applied to joints for use with other types of pipes, including those formed of rigid plastic material.

BRIEF DESCRIPTION OF THE DRAWINGS

FIG. 1 is an isometric view of the novel pipe coupling assembled onto hubless pipe barrels.

FIG. 2 is a side elevation of the novel pipe coupling.

FIG. 3 is a sectional view in the direction of arrows 3—3 of FIG. 2.

FIG. 4 is a partial sectional view in the direction of arrows 4—4 of FIG. 1.

FIGS. 5–8 depict a sequence of steps of installation of the novel pipe coupling.

FIG. 9 is an isometric view of a typical prior art sleeve constrictor.

FIG. 10 depicts the novel pipe coupling in combination with a pipe hanger and stabilizer.

FIG. 11 is a side elevation of one-half of the housing of the novel pipe coupling.

FIG. 12 is a sectional view in the direction of arrows 12—12 of FIG. 11.

FIG. 13 is an enlarged view of a typical sealing sleeve which may be used with the housing of the novel pipe coupling.

FIG. 14 illustrates a conventional fitting with which the novel pipe coupling may be used.

DETAILED DESCRIPTION OF THE INVENTION

Figure 15:
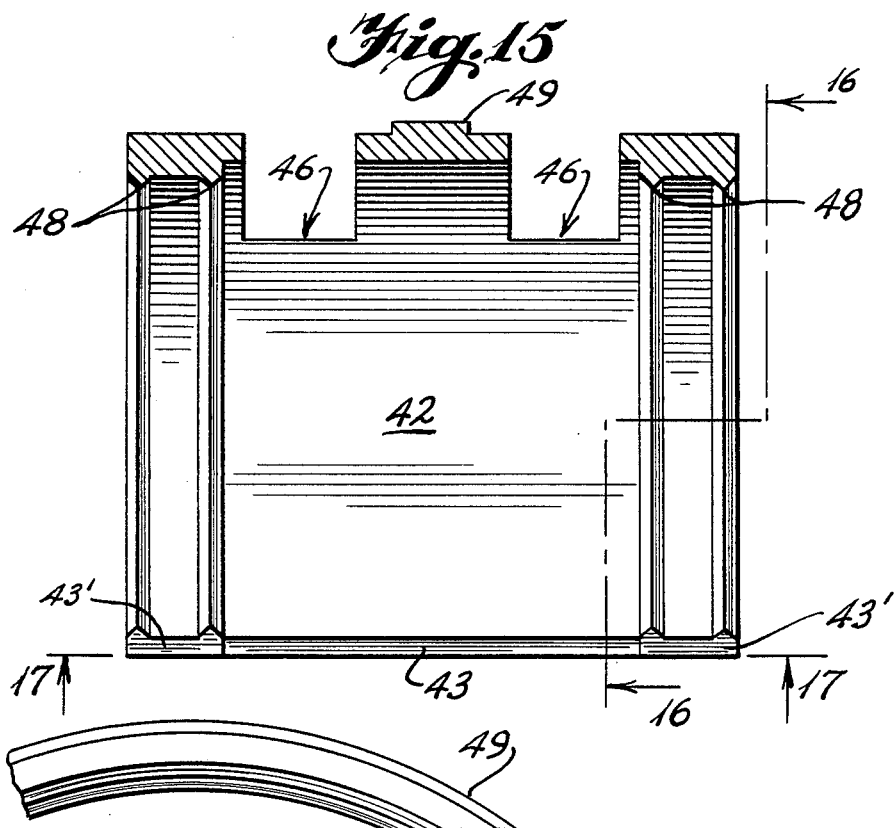
FIGS. 15 and 16 are views corresponding, respectively, to FIGS. 11 and 12 in order to better illustrate the pinch preventing bevels of the rigid housing, FIG. 16 being partially in cross-section as viewed generally in the direction of arrows 16—16 of FIG. 15.

To assemble the pipe coupling, barrel 10 of a hubless cast iron pipe or the like is axially aligned with barrel 12 of another hubless pipe or pipe fitting which, for example, includes a spigot bead 14 encircling the end thereof and increasing the outside diameter of barrel 12, as in FIG. 5.

FIG. 6 shows a sealing gasket or sleeve 20, typical of the prior art, assembled on the aligned barrel ends 10, 12. FIG. 7 shows two worm screw hose clamps 30 positioned for constricting sleeve 20 into sealing engagement with barrels 10 and 12. As seen in FIG. 13, sleeves 20 typically include a center rib 22 against which the ends of the hubless pipes may abut, and sealing ribs 24 for providing a fluid-tight engagement between the sleeve and pipe barrels 10, 12 during tightening of hose clamp 30.

FIG. 8 illustrates the improvement over the prior art, namely, a rigid housing 40 assembled over the sealing gasket or sleeve 20 and hose clamps 30. Housing 40 comprises identical arcuate halves which, when assembled, substantially enclose the juncture of the coupled barrels 10 and 12. As can be seen from FIGS. 11 and 12, each half of housing 40 includes a body 42 having apertures or access slots 46, for a purpose yet to be disclosed. Additionally, body 42 includes a center reinforcing rib 49 which is contiguous with flanges 44 to provide additional structural strength to the housing. Extending outwardly from each flange 44 are two lugs 45 with holes for receiving tightening and attaching bolts 47. The holes in the lugs 45 may be threaded, or additional nuts may be used with bolts 47, for assembly of the two halves of housing 40 about the joined pipe barrels. Further, as may be seen from the drawings, each half of housing 40 comprises inwardly directed ribs 48 with biting surfaces that, during tightening of bolts 47, slightly penetrate the outer surface of barrels of 10 and 12 to prevent their relative axial movement.

Displacement of the pipes and/or the sealing sleeve 20, as might occur during increased internal fluid pressures at the juncture of barrels 10 and 12, is obviated further by hose clamp tightening mechanism 36, 38 extending through apertures or access slots 46 to provide displacement interference between hose clamps 30 and outer housing 40. Because of the rigidity and construction of housing 40, circumferential ribs 48 assist in holding the two pipe ends against lateral and axial separation that might be caused by increased internal or external pressures.

The design of the matching halves of housing 40, in addition to providing ease of manufacture and nesting during storage and shipping, lends itself to the use of a hanger bar 50 (as in FIG. 10) which is thinner than gap 41, so that no undue limitation to the tightening of the housing halves is presented during assembly of the coupling. Thus, the improved coupling provides a built-in adjustable pipe hanger for applications such as horizontal pipe runs near ceilings, below floors, and the like. Hanger 50 is formed of steel with holes to match with those of lugs 45 such that bolts 47 serve as means for tightening the halves around the pipes and for attaching the hanger 50 to the housing 40. Hanger 50 is thinner than gap 41 (between lugs 45 of the assembled coupling) so as not to interfere with clamping of ribs 48 to the outside diameter of the pipes. Hanger 50 has a hole 51 to permit use of a standard threaded rod 52 and nut 54 in adjusting the height of the pipe run for the correct flow slope.

Plumbing codes require a hanger support at each pipe joint and, when using the prior art, a separate hanger assembly is required to be placed near the coupling. The instant invention obviates this need for a separate hanger assembly. For pipes greater than or equal to 6" in diameter, plumbing codes require bracing at every branch or change of direction to prevent joint separation during operation and when the pipe system is placed under test. By the instant invention, the need for this type of bracing also is eliminated.

Sealing sleeve 20 is formed from a flexible material, generally neoprene, under ASTM specification no. C-564. The tightening bands or hose clamps 30 typically are manufactured from stainless steel or other high tensile steel and employ the worm screw adjusting means 36, 38 shown in the drawings. Of course, hose clamps 30 could be substituted with wire tightening bands or the like, although it is thought that the worm screw adjustment means 36, 38 of the common hose clamp 30, extending through apertures 46, provides additional safeguards against loss of a fluid type seal. Stainless steel is generally desired to improve longevity for below grade and other possible corrosive applications. The halves of housing 40 can be molded, cast, or fabricated from plastic, cast iron, steel, ductile iron, or other suitable material for specific application.

Figure 16:
Figure 17:
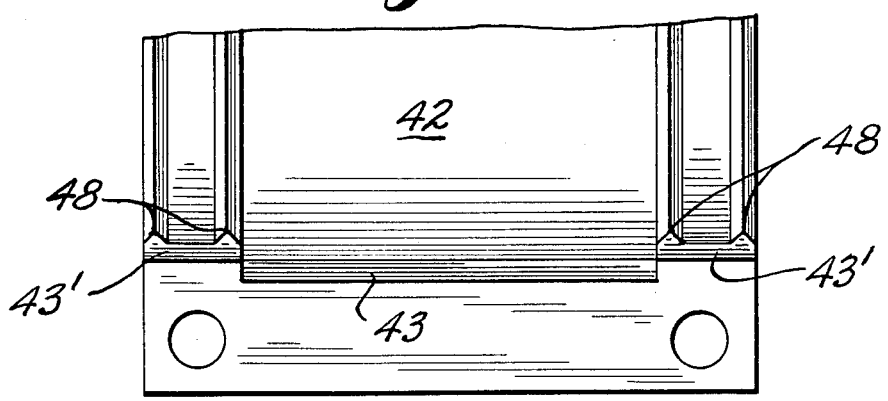
FIG. 17 is an elevation viewed generally in the direction of arrows 17—17 of FIG. 15.

In practice, bevels 43 (best seen in FIGS. 15-17) on the inside surfaces of the housing halves 42 prevent coupling leaks which can and do occur without provision of such bevels 43. When bevels 43 are not provided, closing of housing halves 42 about flexible sleeve 20 can engage and cause pinching of the sleeve, or at least of that part of the sleeve covering one of the two pipes to be coupled, to form a channel between the sleeve and pipe (generally parallel to the pipe length) that is not adequately sealed by subsequent tightening of hose clamps 30. Since two cast iron pipes to be coupled often are slightly different in diameter, the coupling of the invention is manufactured to accommodate such difference and is susceptible to no such pinching. The angle of bevel, as illustrated in FIG. 16 is advantageously 45°, but may be any other angle sufficient to prevent the above-described pinching.

Presently, hubless cast iron soil pipe is used in size ranges of $1\frac{1}{2}"$-15" in diameter and is produced in lengths of five feet and ten feet. Fittings are produced in an assortment of over 600 different patterns, with FIG. 14 illustrating a fitting 60 which is normally referred to as a "reducing $\frac{1}{4}$ bend" having the required spigot beads 62. Housing 40 would also be manufactured in sizes to accommodate these various nominal pipe diameters.

In the past, efforts have been undertaken to develop a coupling for hubless pipes which holds or resists higher internal pressures, generally by employing one type of mechanical clamping pressure around the pipe ends to provide the sealing pressure and the clamping force. The instant invention is an improvement over prior art pipe couplings of this type and, due to its adaptability to existing pipe couplings, involves little added expense and provides adaptability to existing installations. The two major requirements for sealing and coupling the hubless pipes, when exposed to high internal pressures, are that the sealing pressure is still applied and that axial or lateral shifting of the pipes does not occur. Accordingly, the instant invention improves over the prior art by eliminating the axial and lateral pipe shifting problem while enhancing and ensuring a fluid-tight seal by sleeve 20.

It will thus be seen that the objects set forth above, among those made apparent from the preceding description are efficiently attained and, since certain changes may be made in the carrying out the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. In a coupling for axial coupling of cast iron hubless pipes and fittings having barrels with substantially smooth circumferential surfaces near the ends thereof, said coupling comprising a compressible sleeve for receiving two of said ends to be coupled and means for constricting said sleeve about and into sealing engagement with said circumferential surfaces, the improvement comprising:

separate housing means for substantially enclosing said sleeve and increasing the resistance of said coupling to internal fluid pressure of a pipe run, said housing means comprising:

at least two portions connectable together to substantially surround and conform to said circumferential surfaces;

aperture means in at least one of said portions for providing access to said constricting means;

means for tightening said connected portions about said barrels;

means for biting into said circumferential surfaces during said tightening to limit relative axial movement between said barrels; and means for preventing leaks, and comprising bevels on inner surfaces of said portions, said bevels running substantially an axial length of said compressible sleeve such that mounting of said portions about said sleeve and consequent pinching of said sleeve by said portions to cause leaks in said coupling is obviated by said bevels and said biting means.

2. The improvement of claim 1, wherein said housing means is rigid when said portions are connected together to prevent shifting of said barrels laterally with respect to said axial coupling such that additional bracing of said pipe run near said coupling is obviated.

3. The improvement of claim 1, wherein at least a portion of said constricting means extends outwardly through said aperture means to further limit relative axial movement between said barrels.

4. The improvement of claim 1, and further comprising:

hanger means, attachable between at least two of said portions during said tightening, for attachment of said pipe run to a fixed structure at said coupling.

5. The improvement of claim 4, wherein said hanger means is rigid such that sway bracing of said pipe run is provided.

6. The improvement of claim 4, wherein said hanger means comprises means for adjusting said coupling relative to a datum after having coupled said pipes.

7. The improvement of claim 1, wherein said sleeve and said housing means have axial lengths, said housing means axial length being greater than said sleeve axial length and said biting means engaging said circumferential surfaces outside of said sleeve axial length.

* * * * *